United States Patent
Krothapalli et al.

(10) Patent No.: US 9,249,990 B2
(45) Date of Patent: Feb. 2, 2016

(54) MULTIPLE PARABOLIC TROUGH SOLAR COLLECTOR HAVING A FOCUS-TRACKING PIPE ARRAY

(71) Applicants: Anjaneyulu Krothapalli, Tallahassee, FL (US); Jonathan Pandolfini, Westminster, MD (US)

(72) Inventors: Anjaneyulu Krothapalli, Tallahassee, FL (US); Jonathan Pandolfini, Westminster, MD (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 171 days.

(21) Appl. No.: 13/944,067

(22) Filed: Jul. 17, 2013

(65) Prior Publication Data

US 2014/0020678 A1 Jan. 23, 2014

Related U.S. Application Data

(60) Provisional application No. 61/673,389, filed on Jul. 19, 2012.

(51) Int. Cl.

| | |
|---|---|
| *F24J 2/38* | (2014.01) |
| *F24J 2/04* | (2006.01) |
| *F24J 2/12* | (2006.01) |
| *F24J 2/07* | (2006.01) |
| *F24J 2/14* | (2006.01) |
| *F24J 2/46* | (2006.01) |
| *F24J 2/52* | (2006.01) |
| *F24J 2/54* | (2006.01) |

(52) U.S. Cl.
CPC *F24J 2/0483* (2013.01); *F24J 2/07* (2013.01); *F24J 2/12* (2013.01); *F24J 2/14* (2013.01); *F24J 2/38* (2013.01); *F24J 2/4647* (2013.01); *F24J 2/5266* (2013.01); *F24J 2/541* (2013.01); *F24J 2/5406* (2013.01); *F24J 2002/075* (2013.01); *Y02E 10/41* (2013.01); *Y02E 10/45* (2013.01); *Y02E 10/47* (2013.01)

(58) Field of Classification Search
CPC .............. F24J 2/04; F24J 2/0483; F24J 2/05; F24J 2/07; F24J 2/10; F24J 2/12; F24J 2/14; F24J 2/24; F24J 2/245; F24J 2/38; F24J 2/4647; F24J 2/5266; F24J 2/5406; F24J 2/541; F24J 2002/0416; F24J 2002/1075; Y02E 10/40; Y02E 10/45; Y02E 10/47; Y02B 10/20
USPC ......... 126/572, 273, 600–608, 634, 652, 654, 126/680, 684, 692–695
See application file for complete search history.

(56) References Cited

U.S. PATENT DOCUMENTS

| | | | | |
|---|---|---|---|---|
| 2,859,745 | A | * 11/1958 | Von Brudersdorff | ...... F24J 2/02 126/681 |
| 3,868,823 | A | * 3/1975 | Russell et al. | ............. 60/641.15 |
| 3,991,741 | A | * 11/1976 | Northrup et al. | .............. 126/578 |

(Continued)

*Primary Examiner* — Gregory Huson
*Assistant Examiner* — Martha Becton
(74) *Attorney, Agent, or Firm* — J. Wiley Horton

(57) ABSTRACT

A trough collector for solar energy, with multiple parallel troughs preferably being contained within a single unit. The collector does not use conventional azimuth tracking in order to keep the sun's rays directed toward the parabola's focus as the sun moves across the sky. Instead, the relative position between the collecting device (preferably a conductive tube containing a circulating working fluid) and the plane of symmetry for each collector is adjusted so that the collecting device remains within the focal zone of the collector as the sun traverses the sky.

16 Claims, 5 Drawing Sheets

(56) References Cited

U.S. PATENT DOCUMENTS

| | | | | | |
|---|---|---|---|---|---|
| 4,003,366 A | * | 1/1977 | Lightfoot | ............... | F24J 2/07 126/623 |
| 4,150,663 A | * | 4/1979 | Sisson | ............... | 126/603 |
| 4,296,735 A | * | 10/1981 | Llorach | ............... | F24J 2/02 126/674 |
| 4,296,737 A | * | 10/1981 | Silk | ............... | F24J 2/07 126/578 |
| 4,355,630 A | * | 10/1982 | Fattor | ............... | F24J 2/14 126/576 |
| 4,427,838 A | * | 1/1984 | Goldman | ............... | F24J 2/0015 126/605 |
| 4,602,613 A | * | 7/1986 | Barr | ............... | 126/600 |
| 2011/0162637 A1 | * | 7/2011 | Hahn | ............... | F24J 2/07 126/600 |
| 2011/0168160 A1 | * | 7/2011 | Moll et al. | ............... | 126/573 |

* cited by examiner

MULTIPLE PARABOLIC TROUGH SOLAR COLLECTOR HAVING A FOCUS-TRACKING PIPE ARRAY

CROSS-REFERENCES TO RELATED APPLICATIONS

Pursuant to the provisions of 37 C.F.R. section 1.53(c), this non-provisional patent application claims the benefit of an earlier-filed provisional application. The provisional application was assigned Ser. No. 61/673,389 and it listed the same inventors.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of solar energy. More specifically, the invention comprises a solar collector incorporating multiple parabolic troughs and multiple collector pipes running through the troughs, in which the position of the pipes relative to the troughs is varied in order to keep the collector pipes in the focus of the troughs as the sun moves across the sky.

2. Description of the Related Art

Solar energy collecting devices frequently use focusing lenses or reflectors to intensify the energy of the sun. Some collecting devices directly convert the solar energy to electrical energy using a photovoltaic array. Other collecting devices use the solar energy to heat a circulating working fluid. The present invention may be adapted to either type of collecting devices, as well as other types.

FIG. 1 shows an elevation view of a prior art solar collector suitable for heating a circulating working fluid. Parabolic trough 10 receives incoming rays 12. Because the sun may be considered to be an infinite distance away, the incoming rays are effectively parallel. The parabola that is used to define parabolic trough 10 is selected to bring the parallel incoming rays to the same point central focal point 14. Meeting this limitation produces the maximum collection efficiency.

The reflecting trough shown extends for any suitable distance in a direction that is perpendicular to the orientation of the view. For this type of collector, a conductive pipe containing the circulating working fluid is run through central focal point 14, with the pipe running in a direction that is also perpendicular to the view of FIG. 1.

Those skilled in the art will quickly realize that focal point 14 lies along the parabola's axis of symmetry 15, so long as the incoming rays are parallel to the axis of symmetry. Because the reflecting trough actually extends for some distance in a direction that is perpendicular to the view of FIG. 1, axis of symmetry 15 actually defines a "plane of symmetry" that extends along the length of the trough (the plane of symmetry being perpendicular to the orientation of the view).

In FIG. 1, the sun is located directly above the reflector and the rays are coming straight down. Of course, the sun moves across the sky during the course of the day. Parabolic trough 10 must generally be tilted so that the plane of symmetry running through axis of symmetry 15 remains parallel with the incoming rays. This tilting action is generally referred to as an adjustment in "elevation." It is indicated by the reciprocating arrow labeled tracking pivot 16.

Prior art parabolic trough collectors typically include a suitable tilting mechanism in order to adjust the elevation of the collector. This mechanism regulates the elevation of the collector throughout the course of the day. An azimuth tracking mechanism is also frequently included. Such mechanisms tend to be complex and relatively expensive.

FIG. 5 shows a simplified representation of a prior art solar collector that includes both elevation and azimuth tracking. Three parallel parabolic trough reflectors 10 are contained within housing 46. The parabolic troughs each have a finite length. The focus of each trough is therefore not a single point but rather an axis that runs through the focal point existing at each section taken through the trough. Thus, as seen in the view, the three trough reflectors have three parallel focus axes 44.

In order to keep the housing perfectly perpendicular to the incoming solar rays it must be adjusted in both elevation and azimuth. Elevation adjustment 48 tilts housing 46 as indicated. Azimuth adjustment 50 rotates the housing so that it tracks the sun crossing the sky.

One may simply set the elevation adjustment to match the latitude of the location and gain a good approximation of the optimum elevation through the middle of the day. Azimuth, however, is not so easy to approximate. A simple visualization exercise demonstrates this fact: If one sets the azimuth of a device such as shown in FIG. 5 so that housing 46 directly faces the sun at sunrise, it is immediately apparent that the trough reflectors will not receive any direct rays by sunset. For this reason, a housing that lacks azimuth tracking is most often set so that the azimuth is correct when the sun is directly overhead.

This static approach works fairly well for photovoltaic cells but it does not work well for parabolic trough reflectors. FIG. 2 graphically illustrates the focusing error that occurs in the absence of a tracking mechanism. This figure shows a static parabolic trough 10 after the sun has moved away from its zenith position. Incoming rays 12 are no longer parallel to the parabola's axis of symmetry 15 (and plane of symmetry). The result is that the incoming rays are no longer reflected toward central focal point 14. Instead, they have shifted to the right toward shifted focal zone 42. The shift is primarily in a direction that is perpendicular to the plane of symmetry running through axis of symmetry 15. The term "focal zone" is used because a parabola only brings incoming rays into sharp focus when the rays are parallel to the parabola's axis of symmetry. Once the incoming rays are angularly offset from the axis of symmetry, the parabola is no longer able to create a perfect focus. However, over a reasonable range of angular displacement, the parabola is still able to create a good concentration of solar energy and the region of this concentration is therefore referred to as a "focal zone."

The reader will thereby appreciate that it is desirable to position a collector pipe within the focal zone even when the focal zone moves away from the trough collector's plane of symmetry. The present invention presents such a solution.

BRIEF SUMMARY OF THE INVENTION

The present invention comprises a trough collector for solar energy, with multiple parallel troughs preferably being contained within a single unit. The collector does not use conventional azimuth tracking in order to keep the sun's rays directed toward the parabola's focus as the sun moves across the sky. Instead, the relative position between the collecting device (preferably a conductive tube containing a circulating working fluid) and the plane of symmetry for each collector is adjusted so that the collecting device remains within the focal zone of the collector as the sun traverses the sky.

A trough reflector has only one true focal axis. As the incoming rays become misaligned with the parabola's plane of symmetry, the focus shifts laterally and blurs somewhat. However—over a reasonable range of travel—the blurring does not significantly degrade the collection efficiency.

Figure 1:
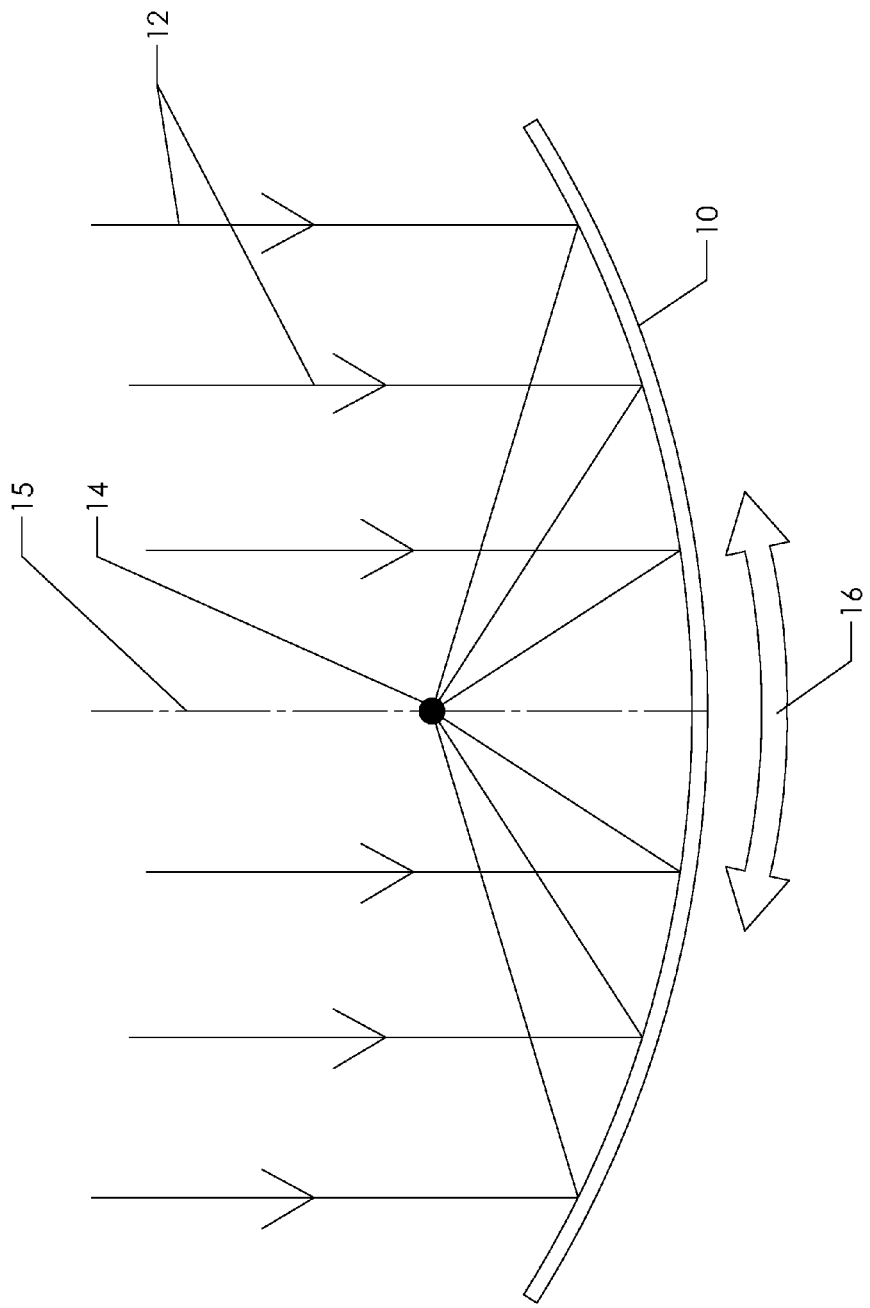
FIG. 1 is an elevation view, showing the operation of a prior art parabolic trough reflector.

| REFERENCE NUMERALS IN THE DRAWINGS | | | |
|---|---|---|---|
| 10 | parabolic trough | 12 | incoming ray |
| 14 | central focal point | 15 | axis of symmetry |
| 16 | tracking pivot | 18 | movable focal point |
| 20 | receiver pipe | 22 | inlet |
| 24 | outlet | 26 | serpentine connector pipe |
| 28 | movable frame | 30 | mounting bracket |
| 32 | gear rack | 34 | drive pinion |
| 36 | motor | 38 | chassis |
| 40 | mounting rail | 42 | shifted focal zone |
| 44 | focal axis | 46 | housing |
| 48 | elevation adjustment | 50 | azimuth adjustment |
| 52 | frame notch | | |

DETAILED DESCRIPTION OF THE INVENTION

Figure 3:
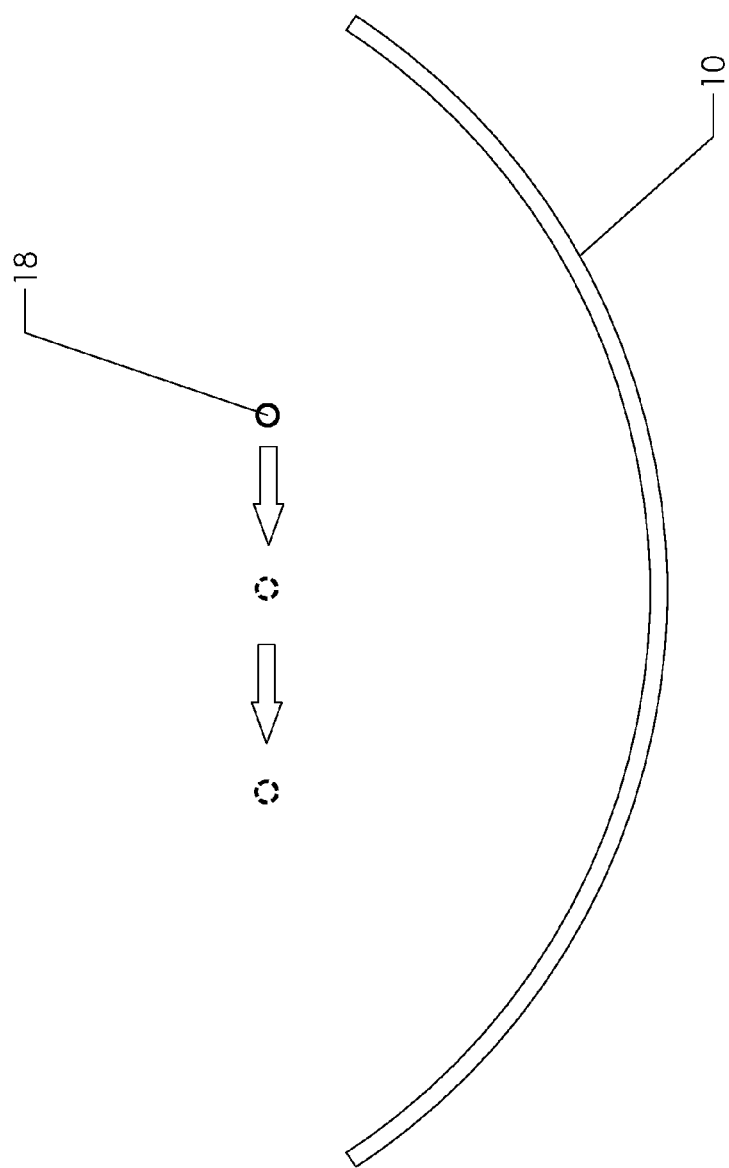
FIG. 3 is an elevation view, showing how the focus of the trough reflector moves laterally as the sun transits the sky.

FIG. 3 shows a parabolic trough 10 with a depiction of a movable focal point 18. The three positions shown in FIG. 3 represent three of the varying positions of the focal zone as the angle of incidence of the sun's rays on the trough reflector changes. The reader will observe how the translation of the focal zone occurs primarily in a direction that is perpendicular to the trough collector's plane of symmetry. A goal of the present invention is to position a suitable energy collection device in the focal zone and alter the relative position between the collecting device and the trough reflector as necessary to keep the collection device in the focal zone.

Many different devices could be employed to achieve this goal and the invention is by no means limited to any particular method or device. However, as the description of a few embodiments may aid the reader's understanding, such a description is provided.

Figure 4:
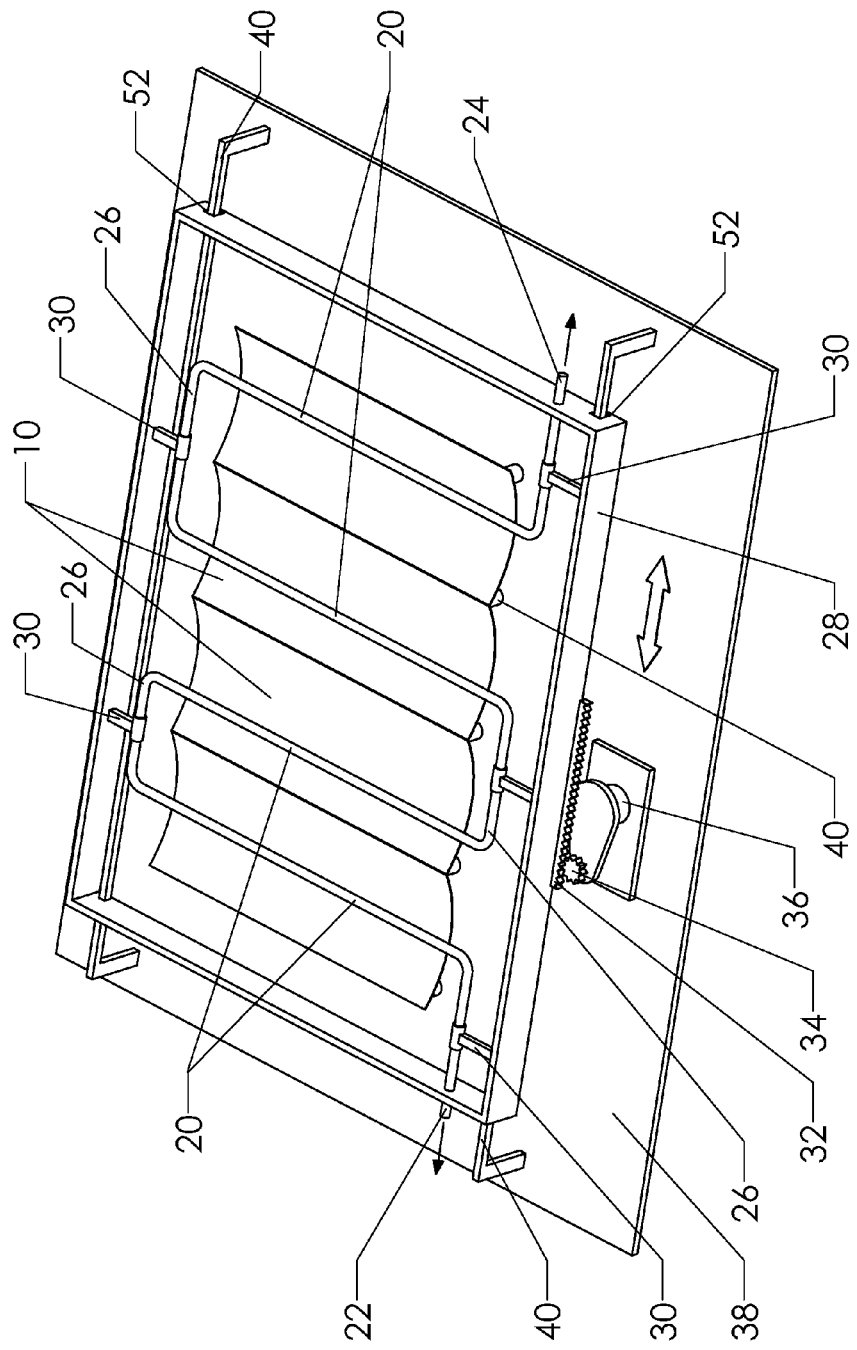
FIG. 4 is a perspective view, showing a depiction of a simple example of the present invention.
Figure 5:
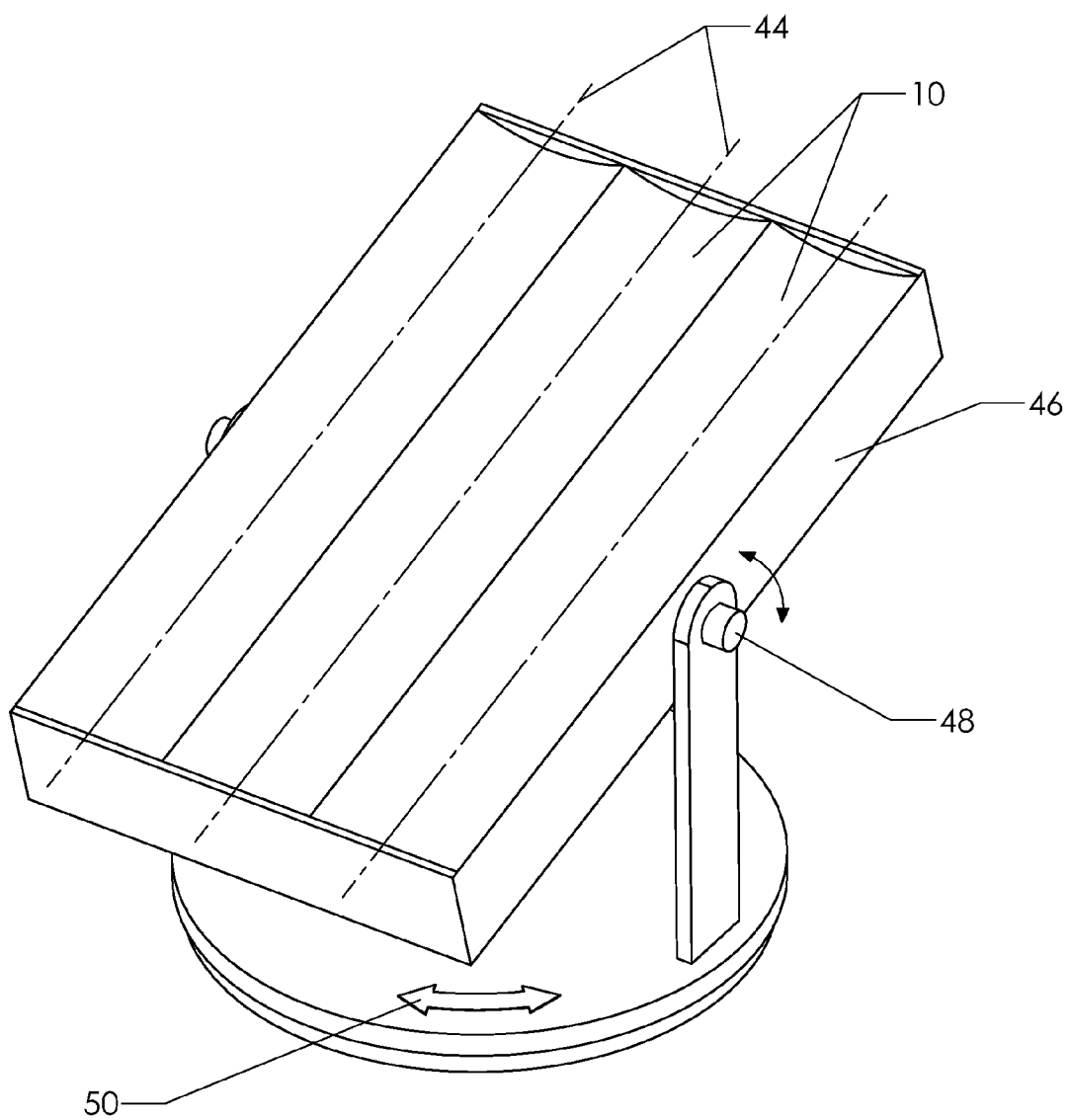
FIG. 5 is a perspective view, showing a prior art collector that is adjustable in both azimuth and elevation.

FIG. 4 shows a simplified embodiment of the present invention that is able to achieve this goal. The reader should appreciate that the embodiment of FIG. 4 illustrates the important components of the invention but should not by any means be viewed as an optimized embodiment. An optimized embodiment would likely contain many more parallel reflector troughs and other components. However, the embodiment of FIG. 4 illustrates the important concepts.

Chassis 38 serves to mount the other components. It is depicted as a flat plate, though it will likely be a more complex structure for most embodiments. Four parallel parabolic troughs 10 are attached to the chassis using one or more supports 40. The parabolic troughs are fixedly attached to the chassis. That is, in this embodiment the troughs do not move. The positioning of the collecting devices in the focal zones of the troughs is accomplished by moving the collecting devices relative to the stationary troughs. In other embodiments, just the opposite will be done.

A receiver pipe 20 is provided for each parabolic trough 10. This receiver pipe is moved laterally with respect to the parabolic trough it lies within so that it remains within the focal zone of the parabolic trough as the sun transverses the sky. In the embodiment of FIG. 4, the four receiver pipes 20 are joined by serpentine connector pipes 26 to form a serpentine flow path from inlet 22 to outlet 24. In other words, a given control volume within the working fluid travels through every receiver pipe in the array. Such a flow path is generally referred to as a "series path." One could also create a parallel flow path by using an inlet manifold, an outlet manifold, and a plurality of receiver pipes flowing therebetween. In such a parallel scheme, a given control volume would flow through only one of the receiver pipes as it travels from the inlet manifold to the outlet manifold.

In the series-flow scheme of FIG. 4, all the pipes in the serpentine flow path are connected to movable frame 28. The connection may assume a wide variety of forms. In this embodiment five mounting brackets 30 are used. The use of these mounting brackets unites movable frame 28 and all the pipes in the serpentine flow path into a single moving unit. The entire assembly therefore moves as one piece.

Movable frame 28 moves on a pair of mounting rails 40. Frame notches 52 in movable frame 28 allow movable frame 28 (and the attached piping) to translate in the directions indicated by the reciprocating arrow. Linear bearings may be employed to allow a smooth movement. A low-friction sliding block may also be placed in each frame notch. Such blocks could be made of NYLON, DELRIN, or any other suitable material. The translation required will be quite slow, so a fairly crude sliding connection will suffice in many applications.

It is, however, preferable to move the frame in a controlled fashion so that the four receiver pipes 20 in this embodiment are accurately maintained in the focal zone of the four parabolic troughs 10 (as the sun transits the sky). In the embodiment of FIG. 4, gear rack 32 is provided somewhere on the movable frame. Drive pinion 34 engages gear rack 32 on movable frame 28. The drive pinion is driven by motor 36 (preferably through a set of reduction gears). Motor 36 is attached to chassis 38.

Thus, by selectively energizing motor 36, movable frame 28 can be moved with respect to chassis 38. The motion may be controlled in any number of suitable ways. One simple approach is to use an open-loop "timetable" that moves the receiver pipes 20 to a predetermined position according to the time of day. One could also employ a closed-loop control system. In this arrangement an energy sensor could be placed at a suitable location on one of the receiver pipes. The control system would then be activated every few minutes during daylight hours and the closed-loop motion control system would adjust the position of the movable frame in order to maximize the energy received by the energy sensor. The energy sensor could be a simple temperature probe or some type of light intensity sensor. Of course, one could also employ a timetable motion controller that is relined by the application of a closed-loop energy sensing function.

Figure 2:
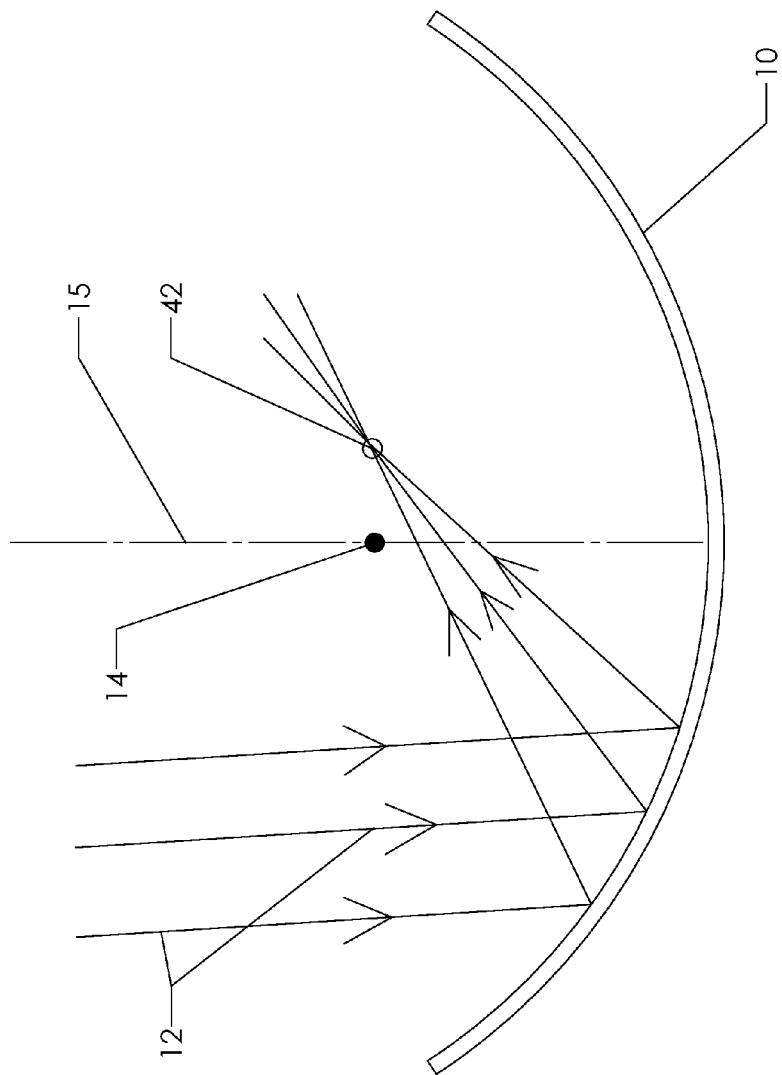
FIG. 2 is an elevation view, showing the operation of the trough reflector of FIG. 1 as the incoming rays are angularly offset from the parabola's axis of symmetry.

Solar tracking is thus performed by the motion of movable frame 28 along with its attached components. Returning briefly to FIG. 1, the reader will recall that each parabolic trough reflector includes an axis of symmetry 15 and a plane of symmetry (the plane of symmetry simply being the axis of symmetry projected along the length of the trough). As explained with respect to FIGS. 2 and 3, the focal zone translates laterally as the sun's angle of incidence on the trough reflector varies. This translation is almost exclusively in a direction that is perpendicular to the axis of symmetry/plane of symmetry. It is therefore apparent that if one can vary the position of the collection device in a direction that is perpendicular to the axis of symmetry/plane of symmetry, one may continually position the collection device in the focal zone.

The embodiment of FIG. 4 achieves the desired positioning of the collection device(s). By activating motor 36 in a controlled fashion, movable frame 28 and its associated receiver pipes 20 is translated in a direction that is perpendicular to the planes of symmetry of the four parabolic trough collectors. This movable feature allows the device to "track" the azimuth of the sun as it transits the sky. The displacement of the center of each receiver pipe from the axis of symmetry/plane of symmetry is referred to as the "receiver pipe displacement distance." Using this nomenclature, those skilled in the art will immediately recognize that a value for the "receiver pipe displacement distance" may be positive, negative, or zero. In other words, although the displacement distance is defined, the actual value of that displacement may be zero at a particular point in time.

Chassis 38 may be set to a fixed elevation setting or elevation tracking may be provided using a conventional mechanism that tilts the entire assembly with respect to the horizontal. If the chassis is static, it is preferable to set the elevation of chassis 38 in order to maximize the efficiency of the collector. The elevation may be set according to latitude. On the equator, the elevation would be zero and chassis 38 would simply be parallel to the ground. At fifteen degrees north latitude, chassis 38 would preferably be set to an elevation of 15 degrees or something slightly less than this to achieve the best approximation of true elevation tracking. For example, the chassis could be mounted so that the side of the chassis proximate motor 36 in the embodiment of FIG. 4 would be lower than the distal side of the chassis (with the upward facing surface of the chassis lying at an angle of 15 degrees to the horizontal).

Those skilled in the art will realize that many other components beyond those depicted in FIG. 4 are preferred in the creation of an efficient collector. For example, it is preferable to enclose many of the components in an enclosure in order to elevate the internal temperatures. Thus, the chassis would typically include opaque side walls extending up and beyond movable frame 28. A clear cover would then be placed over the movable frame and joined to the side walls in order to create a "greenhouse effect." It is also preferable to include mounting bracketry to facilitate the attachment of the chassis to some other structure. All these components are well known to those skilled in the art and they have not been illustrated.

Those skilled in the art will also realize that many other embodiments are possible within the inventive scope of the present invention. As one example, one could design a collector where the receiver pipes remain fixed but the parabolic troughs move laterally to track the sun. Returning to FIG. 4, such an embodiment would involve connecting the reflector troughs to movable frame 28 and connecting the receiver pipes to the chassis so that they remain stationary. One could also choose to move both the reflector troughs and the receiver pipes in order to maintain the desired relative position between the two.

It is also possible to combine the azimuth-accommodating features of the present invention with conventional azimuth-tracking devices. For example, a crude azimuth turntable could be provided that sets the device of FIG. 4 in one of three azimuth positions—morning, noon, and evening. The motion between the receiver pipes and the reflector troughs could then be used to optimize the performance of the device in each of these three stationary azimuth positions.

Thus, although the preceding descriptions contain significant detail, they should properly be viewed as disclosing examples of the inventions' many possible embodiments rather than disclosing the full scope of the invention itself. The scope of the invention will properly be determined by the claims to follow rather than any specific example provided.

Having described our invention, we claim:

1. A method for collecting energy from the sun, comprising:
   a. providing a plurality of parallel parabolic trough reflectors, each of said trough reflectors including a plane of symmetry and a focal axis lying on said plane of symmetry;
   b. wherein each of said trough reflectors creates a focal zone parallel to said focal axis of said trough reflector, with a displacement of said focal zone from said focal axis being dependent upon an angle of incidence of sunlight striking said trough reflector;
   c. providing a receiver pipe for each of said parabolic trough reflectors, each of said receiver pipes running parallel to said focal axis of said trough reflector and being displaced from said focal axis in a direction that is perpendicular to said plane of symmetry of said trough reflector by a receiver pipe displacement distance;
   d. moving said receiver pipes in a strictly linear motion that is perpendicular to said planes of symmetry of said troughs in order to change said receiver pipe displacement distance so that each of said receiver pipes lies within one of said focal zones as said sun transits the sky and said focal zones move;
   e. moving a working fluid through each of said receiver pipes in order to transfer heat to said working fluid and thereby collect said energy from said sun; and
   f. attaching all of said receiver pipes to a movable frame so that moving said movable frame simultaneously changes said receiver pipe displacement distance for every receiver pipe.

2. A method for collecting energy from the sun as recited in claim 1, wherein said receiver pipes are connected in series.

3. A method for collecting energy from the sun as recited in claim 1, further comprising adjusting said plurality of trough reflectors and said plurality of receiver pipes in elevation.

4. A method for collecting energy from the sun as recited in claim 1, further comprising adjusting said plurality of trough reflectors and said plurality of receiver pipes in elevation to track a changing elevation of said sun as said sun transits said sky.

5. A method for collecting energy from the sun as recited in claim 1, further comprising said plurality of receiver pipes in an enclosure.

6. A method for collecting energy from the sun as recited in claim 1, further comprising placing both said plurality of trough reflectors and said plurality of receiver pipes in an enclosure.

7. A method for collecting energy from the sun as recited in claim 1, further comprising placing both said plurality of trough reflectors and said plurality of receiver pipes in an enclosure.

8. A method for collecting energy from the sun as recited in claim 2, further comprising placing both said plurality of trough reflectors and said plurality of receiver pipes in an enclosure.

9. A method for collecting energy from the sun, comprising:
   a. providing a plurality of parallel parabolic trough reflectors, each of said trough reflectors including a plane of symmetry and a focal axis lying on said plane of symmetry;
   b. wherein each of said trough reflectors creates a focal zone parallel to said focal axis of said trough reflector, with a displacement of said focal zone from said focal axis being dependent upon an angle of incidence of sunlight striking said trough reflector;
   c. providing a plurality of receiver pipes, including,
      i. wherein each receiver pipe lies proximate to a focal axis of a particular trough reflector and runs parallel thereto,
      ii. wherein each receiver pipe is displaced from said focal axis in a direction that is perpendicular to said plane of symmetry of said trough reflector by a receiver pipe displacement distance,
      iii. wherein all of said receiver pipes in said plurality of receiver pipes are linked together so that they move in unison;
   d. moving said receiver pipes in a strictly linear motion that is perpendicular to said planes of symmetry of said troughs in order to change said receiver pipe displacement distance so that each of said receiver pipes lies within one of said focal zones as said sun transits the sky;
   e. moving a working fluid through each of said receiver pipes in order to transfer heat to said working fluid and thereby collect said energy from said sun; and
   f. attaching all of said receiver pipes to a movable frame so that moving said movable frame simultaneously changes said receiver pipe displacement distance for every receiver pipe.

10. A method for collecting energy from the sun as recited in claim 9, wherein said receiver pipes are connected in series.

11. A method for collecting energy from the sun as recited in claim 9, further comprising adjusting said plurality of trough reflectors and said plurality of receiver pipes in elevation.

12. A method for collecting energy from the sun as recited in claim 9, further comprising adjusting said plurality of trough reflectors and said plurality of receiver pipes in elevation to track a changing elevation of said sun as said sun transits said sky.

13. A method for collecting energy from the sun as recited in claim 9, further comprising said plurality of receiver pipes in an enclosure.

14. A method for collecting energy from the sun as recited in claim 9, further comprising placing both said plurality of trough reflectors and said plurality of receiver pipes in an enclosure.

15. A method for collecting energy from the sun as recited in claim 9, further comprising placing both said plurality of trough reflectors and said plurality of receiver pipes in an enclosure.

16. A method for collecting energy from the sun as recited in claim 10, further comprising placing both said plurality of trough reflectors and said plurality of receiver pipes in an enclosure.

\* \* \* \* \*